United States Patent
Nair et al.

(10) Patent No.: US 12,513,129 B1
(45) Date of Patent: Dec. 30, 2025

(54) MULTI-DIMENSIONAL MODEL FOR ASSESSING AUTHENTICATION ASSURANCE LEVELS

(71) Applicant: Morgan Stanley Services Group Inc., New York, NY (US)

(72) Inventors: Sandeep Nair, Odessa, FL (US); Julio Caraballo, Woodcliff Lake, NJ (US); Daniel Medina, Brooklyn, NY (US); Tony Liu, Basking Ridge, NJ (US); Nigel Colgan, London (GB); Jordon Storfa, Englewood, CO (US); Ram Durbha, Ashburn, VA (US)

(73) Assignee: Morgan Stanley Services Group Inc., New York, NY (US)

( * ) Notice: Subject to any disclaimer, the term of this patent is extended or adjusted under 35 U.S.C. 154(b) by 65 days.

(21) Appl. No.: 18/653,453

(22) Filed: May 2, 2024

(51) Int. Cl.
*H04L 9/40* (2022.01)

(52) U.S. Cl.
CPC .......... *H04L 63/08* (2013.01); *H04L 63/1483* (2013.01)

(58) Field of Classification Search
CPC ............................ H04L 63/08; H04L 63/1483
See application file for complete search history.

(56) References Cited

U.S. PATENT DOCUMENTS

| 2024/0259371 A1* | 8/2024 | Stockmann | ......... H04L 63/0869 |
| 2025/0039169 A1* | 1/2025 | Lindemann | ............. H04L 63/20 |

* cited by examiner

*Primary Examiner* — Benjamin A Kaplan
(74) *Attorney, Agent, or Firm* — K&L Gates LLP

(57) ABSTRACT

A method comprising receiving, by a computer system, a parameter value for each of multiple parameters for an application for an enterprise and determining, by the computer system based on a first database table lookup, a recommended authentication vector for the application based on the parameter values. The recommended authentication vector comprises assurance level values for authenticator strength assurance level (ASAL), Post Authentication Assurance Level (PAAL), and Origin Point Assurance Level (OPAL). The method further comprises determining, by the computer system based on a second database table lookup, one or more enterprise-certified authentication infrastructures for the application based on the recommended authentication vector and implementing the one or more enterprise-certified authentication infrastructures in the application for a production deployment of the application by the enterprise.

20 Claims, 5 Drawing Sheets

MULTI-DIMENSIONAL MODEL FOR ASSESSING AUTHENTICATION ASSURANCE LEVELS

FIELD

This disclosure relates generally to the field of authentication policy setting, authentication policy evaluation and authentication policy enforcement.

BACKGROUND

Authentication procedures for software-based systems and applications involve the use of authenticators to prove the identity of an entity trying to access the system or application. Critical and sensitive applications require the use of stronger authentication, whereas authentication requirements may be relaxed for less critical and sensitive applications.

SUMMARY

In part, in one aspect, the present invention relates to a method comprising receiving, by a computer system, a parameter value for each of multiple parameters for an application for an enterprise and determining, by the computer system based on a first database table lookup, a recommended authentication vector for the application based on the parameter values. The recommended authentication vector comprises assurance level values for authenticator strength assurance level (ASAL), Post Authentication Assurance Level (PAAL), and Origin Point Assurance Level (OPAL). The method further comprises determining, by the computer system based on a second database table lookup, one or more enterprise-certified authentication infrastructures for the application based on the recommended authentication vector and implementing the one or more enterprise-certified authentication infrastructures in the application for a production deployment of the application by the enterprise. In another aspect, the present invention relates to a system for choosing authenticators, the system comprising a first computer system comprising a first database lookup table to store one or more authenticators and authentication vectors, wherein the authentication vectors comprise assurance level values. The first computer system is further configured to determine a strength of an unknown authenticator based on the one or more authenticators in the first database lookup table. The system further comprising a second computer system comprising a second database lookup table for determining a recommended authenticator of the one or more authenticators for a functional tier of an enterprise based on a recommended authentication vector, a third computer system comprising a third database lookup table for determining an authentication infrastructure for the recommended authenticator, and a fourth computer system for receiving parameter values for multiple parameters for an application for an enterprise. The fourth computer system is configured to implement one or more enterprise-certified authentication infrastructures in the application for a production deployment of the application by the enterprise.

In another aspect, the present invention relates to a method of determining an authenticator for an enterprise, receiving, from a first computer system, parameter values for multiple parameters for an application for an enterprise, determining, by the first computer system, a strength of an unknown authenticator based on one or more authenticators in a first database lookup table, determining, by a second computer system, authenticator vector based on the parameter values, wherein the authenticator vector comprises assurance level values, determining, by a third computer system, a description of authenticators corresponding to the authenticator vector, determining, by a fourth computer system, an infrastructure that supports the assurance level values of the authentication vector, and implementing, by the fourth computer system, one or more enterprise-certified authentication infrastructures in the application for a production deployment of the application by the enterprise. Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

The present invention relates, in one general aspect, to a computer-implemented systems and methods for authentication of identities processable by identity providers. Choosing authenticators for software application, such as SaaS applications, to account for all scenarios and standards that can apply for an application makes it difficult for application owners to choose the right authenticators that can fit the application and customer needs. In addition, this can lead to ambiguity in enterprise policies and procedures, such as a weak security posture or bad customer experience due to underfitting or overfitting of an authenticator with the sessions associated with the authenticator.

The invention provides, in one general aspect, a set of computing tools (systems) that allows for separation of concerns for security, governance, and application owners for an enterprise or organization. The invention comprises in various embodiments four systems: a system for determining the strength of authenticators, which can be used by security practitioners; a system for determining the application functional tier, which can be used by the governance team of the enterprise; a system for mapping the authentication infrastructure capabilities to available authenticators; and a system for prescribing the authenticators based on application characteristics.

The present invention can be used, in various embodiments, for authentication policy setting, authentication policy evaluation and authentication policy enforcement by encapsulating the authentication mechanism and authentication context in the form of a three-dimensional vector. Identity providers (IDP) can process the three-dimensional vector to assign the authentication levels based on integer values.

For example, the invention, in various embodiments, may distinguish between a fingerprinted device and a SMS one time password (OTP), and use an authentication vector to communicate with the target application. The system can communicate using Authentication Context Class Reference (ACR) and the application can request the IDP for a particular authenticator or an IDP sending the authentication level achieved. Even in scenarios where an IDP may not be capable of implementing journeys that can validate all the three dimensions, the vector can be used to establish a policy for a given application, which may implement certain dimensions on its own. In other words, the disclosed system may provide a common authentication policy language that can be used for authentication policy setting, authentication policy evaluation and authentication policy enforcement.

Figure 1:
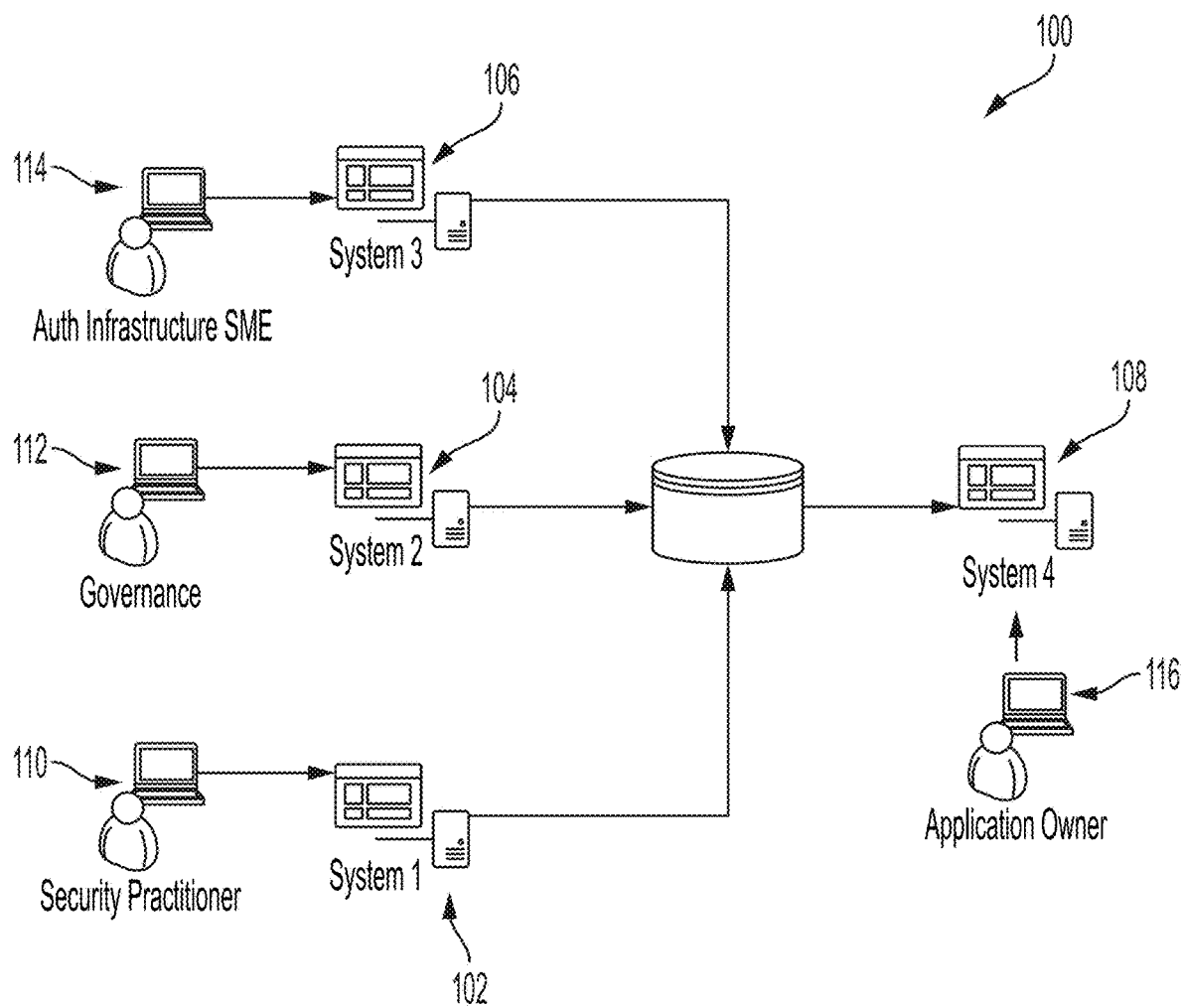
FIG. 1 illustrates a system for determining an authentication vector for an authenticator and then prescribing the authenticator, based on its vector, to an application (e.g., a web or SaaS application), according to an exemplary embodiment of the present invention.

With reference now to the figures, FIG. 1 illustrates a system 100 for determining an authenticator vector for an authenticator, and then potentially prescribing the authenticator based on its vector to an application (which can be a SaaS application, for example) according to an exemplary embodiment of the present invention. The system 100 comprises a first system 102 for determining the strength of authenticators; a second system 104 for determining the application functional tiers; a third system 106 for mapping the authentication infrastructure capabilities to available authenticators; and a fourth system 108 for prescribing the authenticators based on application characteristics. An authenticator in this context provides an extra layer of security to confirm a user's identity for access to an application or software system. An authenticator can be single factor or multi-factor, and could be, for example, a password, an OATH one-time password (OTP), a mobile push, a FIDO U2F, Secure Shell, FIDO2, cryptographic keys, passes, biometrics, etc. The systems 102, 104, 106, 108 could be implemented with computers (e.g., laptop, desktop, mobile) or servers (including cloud-based servers) or a pod of one or more containers, for example. The systems 102, 104, 106, 108 may communicate via an electronic data network, such as one or more LANs, WANs, the Internet, an intranet, etc. In the illustrated embodiment, the first system 102 is the security system, the second system 104 is the governance system, the third system 106 is an authentication system, the fourth system 108 is a prescribing system.

The first system 102 may guide a security practitioner 110 of the enterprise in determining the relative strength and the dimension of an authenticator, update the strength of an authenticator, and/or add a new category of authenticators for the enterprise.

A user 112 of the second system 104, in the governance function of the enterprise, may add, define or remove functional tiers of authenticators and/or map the functional tiers to available authenticators.

The third system 106 may allow infrastructure subject matter experts (SMEs) 114 to create and modify Identity, Access Management (IAM) infrastructure details for the enterprise and map the infrastructure to the supported authenticators.

The fourth system 108 allows for configuration of queries to be posed to the application owner 116, takes application owner inputs on application characteristics, and provides recommendations for authenticators for an application.

For example, the first system 102 stores and classifies authenticators by a three-dimensional vector. The authenticators may be classified into three dimensions as follows: Authenticator Strength Assurance Level (ASAL), Post Authentication Assurance Level (PAAL), and Origin Point Assurance Level (OPAL). Each dimension comprises a significant level and a finer level. For example, the significant level is an integer value from 0 to 3 and the finer level is a decimal value, where greater values indicate more significance. Thus, for each dimension, the value is the significant level plus the finer level. For example, the three-dimensional vector can be defined as [ASAL SL.FL, PAAL SL.FL, OPAL SL.FL]. The stored vectors can be used to score new authenticators as described herein.

The levels can be based on the relative strengths or weaknesses between the various authenticators (ASAL) and various attributes (PAAL, OPAL). The levels are not absolute. The relative strengths can be established based on criteria such as, phishing vulnerabilities, proof of possession strength, replay resistance, difficulty of attribute acquisition, or similar criteria. In some embodiments, the levels are a ranking of the authenticators and the attributes.

If a new authenticator is presented, the first system 102 will compare the new authenticator to the existing authenticators for the enterprise stored by the first system 102 and place the new authenticator in the ranking between the existing authenticators where the new authenticator is ranked. For a new authenticator, the relative strengths and weakness can be compared to establish a relative strength of the new authenticator in relation to the existing authenticators. For example, the new authenticator is either of equal, less, or greater strength than existing authenticators. The new authenticator can be assigned a three-dimensional vector based on its relative strength in comparison to the existing authenticators.

The finer level can be a 2-digit number and may be determined by the process depicted in FIG. 3, which is described in more detail below. In some embodiments, the finer level can be expanded to multiple digits for finer authentication dimensions.

Figure 2:
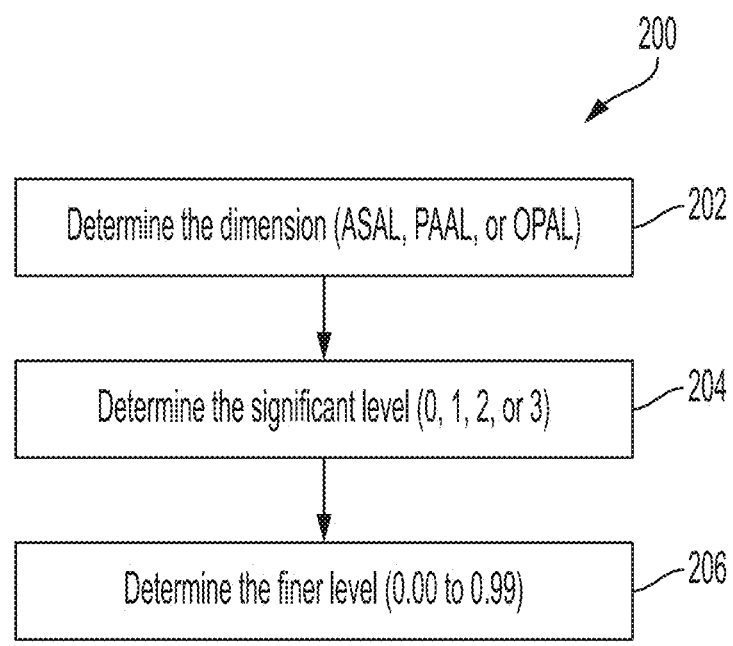
FIG. 2 illustrates a method of determining the three-dimensional vector of an authenticator, according to an exemplary embodiment of the present invention.

The first system 102 can utilize the example method 200 shown in FIG. 2 to compute an authentication vector for an authenticator, such as a new authenticator (new to the enterprise) based on the vector for other known and/or used authenticator of the enterprise stored by the first system 102. At step 202, the first system 102 determines the applicable dimension of the vector, which can be ASAL, PAAL, or OPAL, as described above, with a different dimension selected for subsequent iterations of the method 200 so that, over three iterations, all three dimensions are selected once. At step 204, the first system 102 determines the significance level for the applicable dimension from step 202. The first system 102 can then determine, at step 206, the finer level for the dimension. An example of determining the finer level is shown in FIG. 3. The first system 102 can repeat the method 200 for all three dimensions, ASAL, PAAL, and OPAL.

For example, the dimension at step 202 can be determined based on a table such as the following table:

| ASAL | PAAL | OPAL |
|---|---|---|
| Is the Authenticator in sole control of user? | Is the authenticator computable or established after a user has successfully authenticated with ASAL? | Does the Authenticator represent where the authentication originated? |

The first dimension is the ASAL. The ASAL assigns a level to the authenticator and authenticator combinations. The ASAL may be determined by the determination that the authenticator is in sole control of the user.

The ASAL divides the authenticators into 4 main levels, where the most significant digit will mainly be aligned to the generally rating of 1, 2, or 3 corresponding to the significant level, where 3 is the strongest authenticator level. A ranking of zero indicates that the ASAL does not exist. The authenticator strength is preferably aligned with the strength of the authenticator. The ASAL can be a floating number format with at least 2 decimal digits. The number of digits can be expanded to include more digits for a finer rating system for the finer level.

The significant level of the ASAL is determined at step 204 by the number of unique factors in the authenticator. The factors may be based on knowledge, possession, biometric, or a combination thereof involved with the authenticator.

For example, the significant level of the ASAL may be determined based on the example below table. Each column lists the class of authenticators that coincides with the significance level. The significance level of 0 may be a single factor authentication, which may be applicable for low assurance use case. The significance level of 1 may also include single factor authentication where the factor is not zero, or where two factors of the same type are used. The significance level of 2 may include two unique factors, such as knowledge and possession, possession and biometric, or knowledge and biometric, for example. The significance level of 3 may have two factors with an additional requirement. For example, the additional requirement may be where one factor must be in possession of a hardware authenticator and the other factor may be one of a knowledge or biometric factor that unlocks a key to enable cryptographic validation.

| SL 0 | SL 1 | SL 2 | SL 3 |
|---|---|---|---|
| Knowledge Based Questions Social Login Voice Authentication, Pin Email OTP | Any Single Factor not in SL 0 | Combination of any unique 2 Factors. | Combination of 2 Factors with the following requirements One Factor must be possession of Hardware Authenticator And the other factor can be Knowledge or Biometric that unlocks a key to enable cryptographic validation. |

Figure 4:
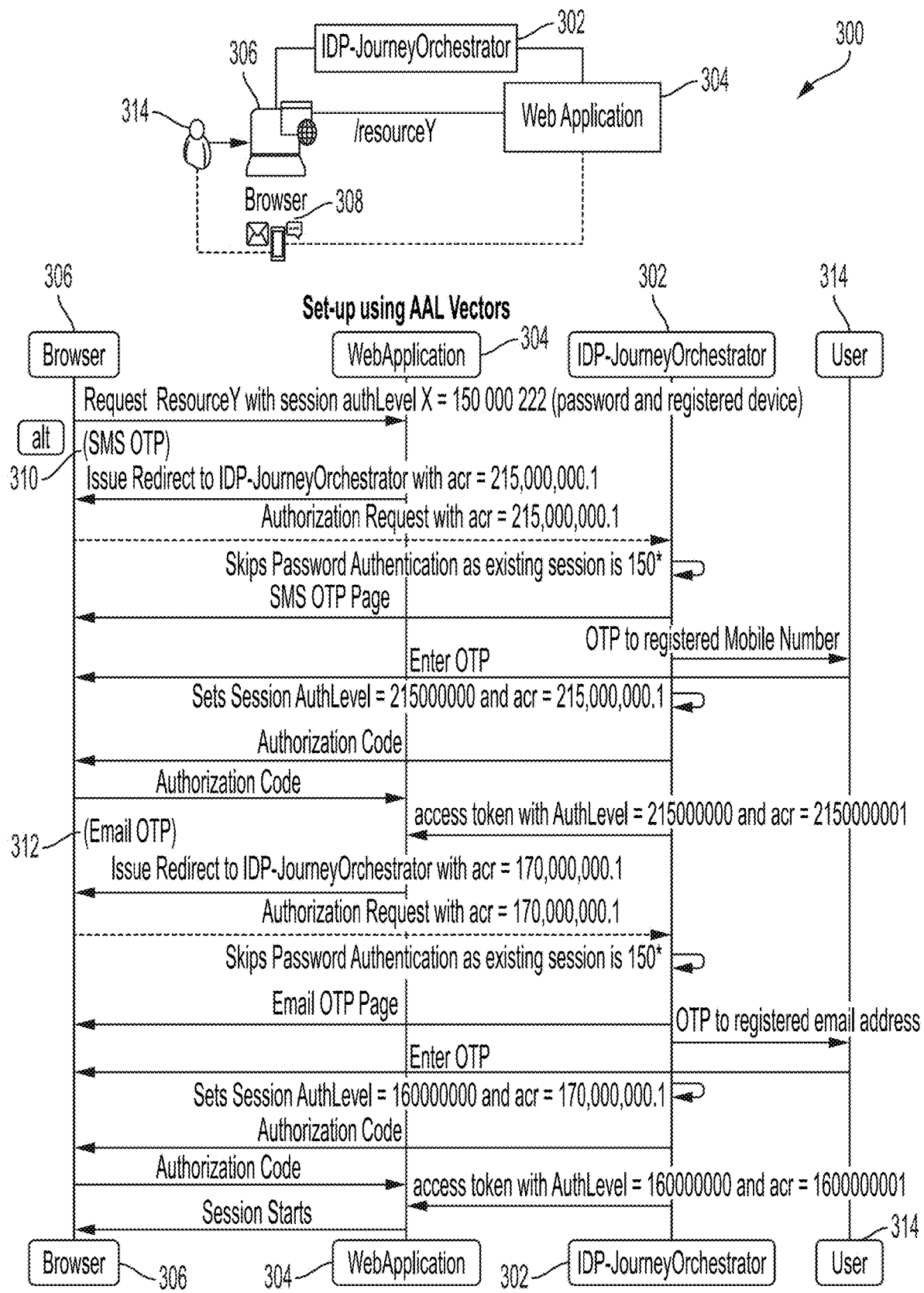
FIG. 4 illustrates an example of step-up run time process, according to an exemplary embodiment of this invention.

The second dimension is defined by the PAAL. The PAAL represents the assurance of post authentication factors. The PAAL assesses the context in which authentication happens and the authorization the ID needs to have to perform the function. This assurance level can be used deny access or report abnormal activity. The context can be based on a risk score and behavior biometrics. Upon denial of access based on PAAL the user of an application/system with the authenticator may be sent for step-up authentication (an example of which is shown in FIG. 4).

The significance level of the PAAL is determined at step 204 based on, for example, the use of at least one of persistent roles, just in time roles, risk score based on context, behavioral biometric/patterns associated with user interaction with system, or combinations thereof. For example, the below table may be used to calculate the significance level of the PAAL.

| SL 0 | SL 1 | SL 2 | SL 3 |
|---|---|---|---|
| Persistent assigned Role or Behavioral biometric or Risk score | Combinations of SL0 | JIT Role in combination with 1 SL0 (except persistent role) | JIT Role combined with Risk score and Behavioral |

The third dimension is OPAL. The OPAL represents the device (User Agent) origin. This can be from an IP, subnet, or a Managed device. This assurance level is more significant in business-to-employee (B2E) and business-to-business (B2B) scenarios where the point of origin can be used to explicitly deny even the strongest of authenticators. For example, the system may deny access to a company's SaaS applications if the employee comes from an unrecognized IP or device.

The first system 102 may determine, at step 204, the significant level of the OPAL based on a table, such as the table below:

| SL 0 | SL 1 | SL 2 | SL 3 |
|---|---|---|---|
| Geolocation | Device Fingerprint (not bound to user) IP-company external IP (NAT) list Company Intranet Federated from Trusted Partner IP-subunit department Application cluster | Combination of any 2 SL1s Combination of SL1 and geolocation and Firm Managed Device Not bound to user. | Firm Managed Device Bound to user. Firm Managed Device Bound from known IP or known subnet. |

That is, for example, if an authenticator has any of the features in the SL3 column, its significance level is 3. If an authenticator has any of the features in the SL2 column and none of the features in the SL3 column, its significance level is 2, and so on.

The finer levels for each of the three dimensions can be two-digit decimal values from 0.00 to 0.99 (e.g., s1.00 to s1.99), although the number of finer level digits may be increased in other embodiments for finer authentication stratification. As described above, the value of each dimension preferably is SL.FL where SL is a value from 0 to 3 as determined at step 204 and FL is a value from 0.00 to 0.99 as determined at step 206, an embodiment of which is illustrated at FIG. 3, which method can be performed by the first system 102.

For example, at step 210, the first system 102 determines if authenticators exist in the significant level for the authenticator being "dimensionalized," e.g., the authenticator for which the method of FIG. 2 is being deployed. For example, if the authenticator has a significant level of 2, the first system 102 determines at step 210 whether there are authenticators in level 2.

If there are no authenticators in the significant level of the authenticator, the method 206 follows the "no" path. The system 102 then determines at step 212 if the authenticator is widely used, e.g., have a threshold level of adoption or popularity. If the authenticator is widely used, the method 206 follows the "yes" path and the finer level is set at step 214 to the midpoint (e.g., 0.5), for example. If the authenticator is not widely used, the method 206 follows the "no" path, and the finer level is set at step 216 to either 0.25 or 0.75 based on the perceived strength of the authenticator. The perceived strength of the authenticator is based on phishing vulnerabilities, proof of possession strength, replay resistance, difficulty of attribute acquisition, or similar criteria.

If authenticators do exist in the significance level of the authenticator at step 210, the method 206 follows the "yes" path and the first system 102 determines at step 218 if the authenticator is stronger than the weakest authenticator in the significance level. For example, the strength of the authenticator is compared to the strength of the existing authenticators stored in the first system 102. The strength can be based on criteria such as phishing vulnerabilities, proof of possession strength, replay resistance, difficulty of attribute acquisition, or similar criteria.

If the authenticator is not stronger than the weakest authenticator in the significance level, the method 206 follows the "no" path, and the finer level is set at step 220 near the mid-point, for example. For example, the near-mid-point value can be (weakest level-significant level)/2. For example, if the authenticator is weaker than the weakest authenticator in the level, and the weakest authenticator is 2.3, the finer level is (2.3-2)/2, which equals 0.15 in this example. Thus, the finer level equals 0.15 in this example.

If the authenticator is stronger than the weakest authenticator in the significance level, the method 206 follows the "yes" path from step 218, and the method 206 determines at step 222 if the authenticator is stronger than the next strongest authenticator in the list.

If the authenticator is not stronger than the next strongest authenticator in the list, then the method follows the "no" path and sets, at step 224, the finer level can be the mid-point of the strength levels of the two authenticators that it is between. For example, if the stronger authenticator has a strength of 2.3 and the weaker authenticator has a strength of 2.2, the finer level is the midpoint of 0.2 and 0.3, which is 0.25. Thus, the finer level is set to 0.25.

If the authenticator is stronger than the next authenticator in the list, the method 206 follows the yes path and determines, at step 226, if a stronger authenticator exists. If there is a stronger authenticator exists, step 222 repeats.

If there are not stronger authenticators, then the method 206 follows the "no" path and the method sets at step 228 the level to near the mid-point of the strongest authenticator in the significant level and the significant level+1. For example, if the strongest authenticator has a level of 2.9 and the authenticator is stronger than this authenticator, the level is set to 2.95, where the finer level is 0.95. The current authenticator is 2.9 and the significant level+1 is 3, thus the mid-point is 2.95.

Turning back to FIG. 1, the second system 104 can add, define, and/or remove functional tiers of an authenticator and allows mappings of the functional tiers to available authenticators. Available authenticators can be the authenticators that are stored in the first system 102.

The functional tiers classify the application functions that user accesses based on the criticality and impact. The functional tiers may be based on the type of user, risk profile of application, nature of data, and the scope of access. For example, the below table may be used to determine the functional tiers:

| Internal Users | External Users |
| --- | --- |
| Firm Access: Access to Firm Data and Functions. This can be further sub-tiered based on the risk profile of application being accessed i.e. High, Medium and Low | Basic: Access to shared data that is not user specific and is shared * Normal: Regular and relatively frequent access Elevated: Less frequent and sensitive access. |
| Self-Access: Access to Own/self-Data and Functions | |

For example, the type of user may be either an internal user or an external user. For an internal user the functional tiers can further be divided into based on scope of access such as firm access or self-access. The functional tiers can be divided even further based on the risk profile and nature of the data being accessed.

For an external user, the functional tiers can further be classified based on the risk profile, nature of the data, and the scope of access. For example, this can include basic, normal, or elevated functional tiers.

The functional tiers are mapped to authenticators. The mappings preferably ensure that stronger authenticators are applied to higher tiers and that lower tiers are mapped to weaker authenticators. Each tier can have multiple authenticators with different values in dimensions. In one aspect, no two tiers can have identical values across the three dimensions. For example, for each tier, a three-dimensional vector is mapped to the tier.

For example, in the case of external users, the basic tier vector may be [150 000 000] and the normal tier vector may be [150 070 222]. A basic and normal tier could both use passwords (ASAL dimension). A normal tier may have additional validation options like risk scoring (PAAL dimension) and device binding (OPAL dimension). In some embodiments, a normal vector must be greater in at least one dimension and at least equal in other dimensions.

The third system 106 allows infrastructure SMEs 114 to create and modify the IAM infrastructure details of an authenticator and to map the infrastructure to supported authenticators.

For a given authenticator, the infrastructure SME 114 can provide certain information to establish the AAL (Authenticator Assurance Level) dimension in the first system 102, and the finer levels of the authenticator supported by the infrastructure. For example, the SME 114 can provide the identifier of the authenticator infrastructure, the business line in the enterprise supported, the user type supported, the client supported, the dimension supported, and the dimension level supported. In another embodiment, the application owner 116 provides the business line supported, the user type supported, and the client supported through the fourth system 108. The second system 104 can determine a description of authenticators that match the dimension level.

For example, the table below illustrates an example of infrastructure attributes and their description.

| Infrastructure Attributes | Description |
|---|---|
| Auth Infrastructure | The identifier for the Authentication Infrastructure |
| Business Line | Line of Business supported by the Authentication Infrastructure |
| User Type | User Type supported. Options are: (B2E, B2B, B2C) |
| Client | The type of client supported: (Browser, Thick, Mobile) |
| MS-AAL dimension | The Dimension supported: (ASAL, PAAL, OPAL) |
| Dimension Level | The Specific Dimension Level supported: (SL.FL) |
| Dimension Options | The description of authenticators that match the dimension level. This is a calculated field |

| Infrastructure Attributes | Description |
|---|---|
| Credential Generator 1 | The entity that presents or applies the credential. Example: for passwords (ASAL), the credential generator will be the user. For assigning roles (PAAL), the credential generator will be the system that maps the user to a role. For IP (OPAL): The Device will be the generator |
| Credential Type 1 | The type of credential. Example: password, Directory Group, IP |
| Challenge Generator 1 | If applicable (typically for Challenge response authentication process), this will be the entity/service that generates a nonce. |
| Credential/Key Store 1 | If Applicable (typically for Challenge response authentication process), the entity that stores the key or secret. |
| Credential/Challenge Response Verifier 1 | the entity that verifies the credential or the response to the challenge |
| Credential Generator 2 | The entity that presents or applies the credential. Example: for passwords (ASAL), the credential generator will be the user. For assigning roles (PAAL), the credential generator will be the system that maps the user to a role. For IP (OPAL): The Device will be the generator |
| Credential Type 2 | The type of credential. Example: password, Directory Group, IP |
| Challenge Generator 2 | If applicable (typically for Challenge response authentication process), this will be the entity/service that generates a nonce. |
| Credential/Key Store 2 | If Applicable (typically for Challenge response authentication process), the entity that stores the key or secret. |
| Credential/Challenge Response Verifier 2 | the entity that verifies the credential or the response to the challenge |
| Credential Generator 3 | The entity that presents or applies the credential. Example: for passwords (ASAL), the credential generator will be the user. For assigning roles (PAAL), the credential generator will be the system that maps the user to a role. For IP (OPAL): The Device will be the generator |
| Credential Type 2 | The type of credential. Example: password, Directory Group, IP |
| Challenge Generator 3 | If applicable (typically for Challenge response authentication process), this will be the entity/service that generates a nonce. |
| Credential/Key Store 3 | If Applicable (typically for Challenge response authentication process), the entity that stores the key or secret. |
| Credential/Challenge Response Verifier 3 | the entity that verifies the credential or the response to the challenge |

The fourth system 108 may be configured to send a set of queries to be posed to the application owner 116, take the response(s) to the set of queries from the application owner 116 on application characteristics, and provides recommendations for authenticators for application.

For example, the application owner 116 may receive a questionnaire which poses a plurality of questions to determine, for an application, the business type, user type, client type, application risk rating, the privilege function, and the scope of access (see below table). The questions may be about users, access, and risk in order to provide a recommendation on the authenticators to use. The below table is an example of the questions to be asked in the questionnaire:

| Question to be Asked | Description |
|---|---|
| Business | The Business line of application |
| User Type | Whether the user is an internal-user, partner or consumer. Options: B2E, B2B, B2C |
| Client | Browser, Mobile or Thick client |
| Application Rating | The Application Risk Rating |
| Privileged function | Options: Yes, No (for internal users) and N/A for external users |
| Access Scope | The scope of Access Firm, Self for internal users. Basic, Normal, Elevated for external users |

The application owner answers the questions in the questionnaire with respect to an application. The fourth system 108 processes the input questionnaire to provide a prescriptive recommendation of an authenticator(s) for the application. The recommendation is based on the answers from the questionnaire, and the data provided from the first, second, and third systems 102, 104. 106. The final recommendation preferably provides the significant level and fine level for all the dimensions and authentication infrastructure that will support them.

For example, assume that a new authenticator is a security key from a reputable vendor. The security key is hardware used either with NFC or by inserting it into a USB drive. This security key does not require a pin. Hence it is only a proof of possession (what you have) authenticator. The first system 102 can determine in this example that the authenticator is in sole control of the user and determines that the dimension supported is ASAL. The first system 102 can further determine the significant level will be 1 in ASAL based on the strength of the authenticator.

Figure 3:
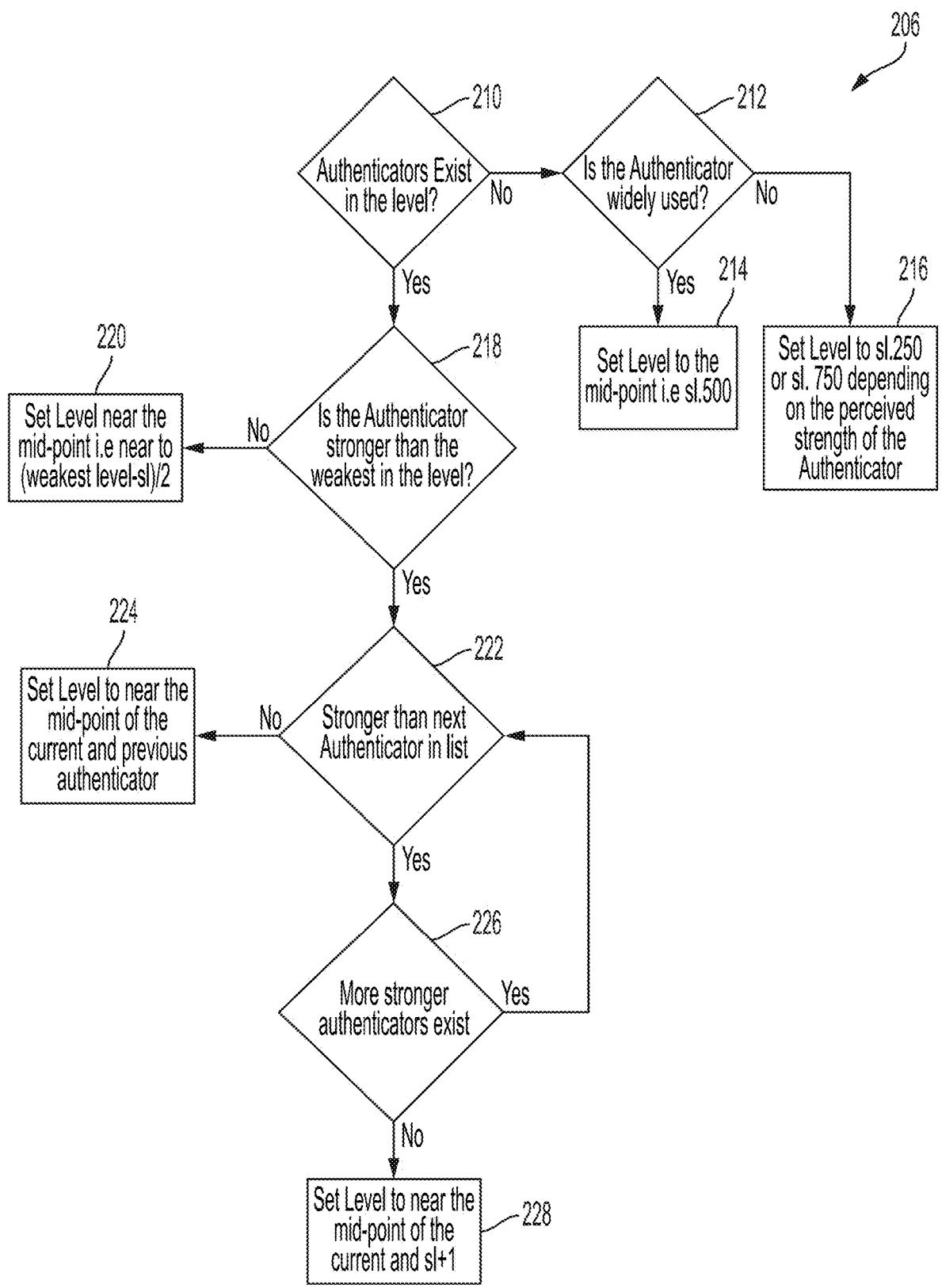
FIG. 3 illustrates the method of determining the finer level of an authenticator, which is part of the process of FIG. 2, according to an embodiment of the present invention.

Under significant level 1, the first system 102 iterates through the existing authenticators using method 206 of FIG. 3. Considering that the authenticator is hardware and cryptography based and hence highly phishing resistant, the first system 102 can establish that it is stronger than password and email OTP authenticator, which may be at a level of 1.7. Assuming, that there are no stronger authenticators established at this point, the first system 102 determines the finer level to be 0.85 (e.g., (2.0-1.7)/2+1.7). The first system 102 may determine 1.85 as the strength, but since the first system 102 estimates that there could be more stronger variants in the future and the system only have a namespace of 100 to work with, the first system 102 may choose 1.80 as the established authenticator level.

In another example, the application owner 116 confirms the following for a function or roles within their application through the questionnaire in the fourth system 108. The application owner 116 inputs the following to the fourth system 108: Business Unit: Corporate; User Type: B2C; Application Risk Rating: N/A (since the user type is B2C, the risk rating of application is not relevant); Privileged Role: N/A; Type of Access: Normal.

The information is provided then to the second system 104, where the second system 104 provides the prescription for authenticators that can be used based on the information from the fourth system 108. In this example the second system 104, determines the options below in vector form based on what the SME for governance 112 has set: [150 0 220] or [215 0 0].

The first system 102 determines the description of the authenticators, where the definitions and the supported authenticators are defined.

The third system 106 is then queried, to provide the infrastructures that support each dimension of the vector. The input provided to the system 100 is the business unit, along with the prescribed authenticator level vector and the user type. The resultant response will provide the authentication infrastructure that supports the vector.

In some embodiments, depending on the infrastructure, the prescription can be provided to the infrastructure operators, so that they can implement it and provide the necessary guidance to the application owners.

FIG. 4 illustrates an example of step-up run time process, according to an exemplary embodiment of the present invention. The diagram 300 illustrates the system of how the authentication level vectors can be used to communicate between the IDP and application. The user 314 communicates with the browser 306 to access the web application 304. The IDP 302 controls access to the web application 304. The user can also utilize a mobile device 308 with email and SMS messaging.

For example, the user requests access to the web application. The application can request, based on the ongoing transaction, a specific higher level of authenticator. As shown, the user had initially authenticated with password, but the application may request additional authentication via SMS OTP 310 or email OTP 312. This is communicated to the IDP, which will complete the necessary authentication journey with the user. Upon successful authentication, the new vector will be communicated back to the application.

The vector can optionally be extended with an additional number that can represent the specific authenticator, if there are multiple authenticators for the given significant level and finer level.

Figure 5:
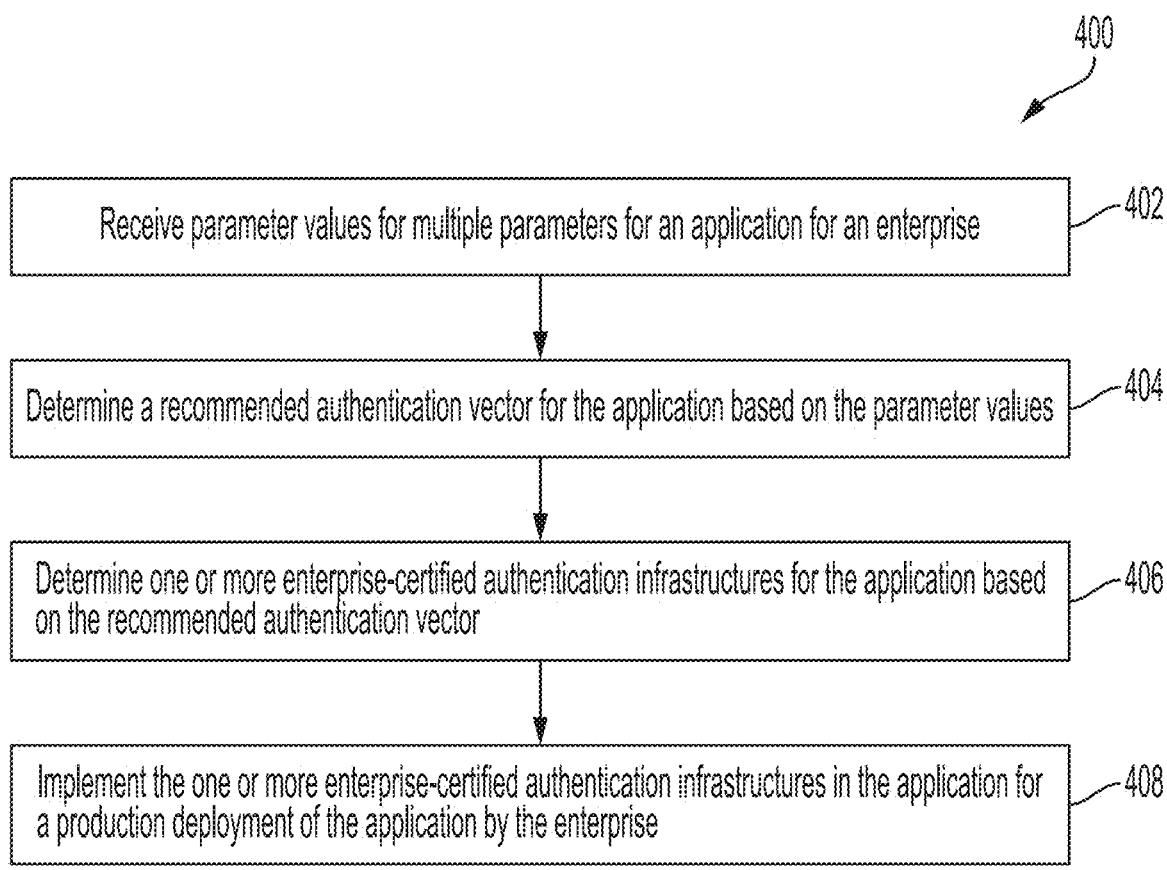
FIG. 5 is a method of determining authenticators for a new enterprise, according to an exemplary embodiment of this invention.

FIG. 5 is a method of determining authenticators for a new enterprise, according to an exemplary embodiment of this disclosure. The method 400 may be implemented by the system 100 and is described in conjunction with FIG. 1.

In accordance with method 400 the first system 102, the second system 104, and the third system 106 receive parameter values for multiple parameters for an application for an enterprise from the fourth system 108. The fourth system 108 receives parameter values can be from a user or owner of an application.

The first system 102 determines, by a first database table lookup, a recommended authentication vector for the application based on the parameter values. The recommended authentication vector comprises assurance level values for authenticator strength assurance level (ASAL), Post Authentication Assurance Level (PAAL), and Origin Point Assurance Level (OPAL). The third system 106 determines, by a second database table lookup, one or more enterprise-certified authentication infrastructures for the application based on the recommended authentication vector. The fourth system 108 implements the one or more enterprise-certified authentication infrastructures in the application for a production deployment of the application by the enterprise.

In some embodiments, the second system 104 determines, by a third database table lookup, a recommended authenticator for a functional tier of the enterprise based on the recommended authentication vector.

In some embodiments, the multiple parameters comprise at least one of a business type, user type, client type, application risk rating, privilege function, access scope, or combinations thereof. In some embodiments, the assurance level values are based on phishing vulnerabilities, proof of possession strength, replay resistance, difficulty of attribute acquisition, or combinations thereof.

In some embodiments, the first system 102 stores authenticators in the first database table lookup. The assurance level values comprise a significant level and finer level. The significant level is an integer, and the finer level is a floating-point number. For example, the assurance level values are a ranking of a strength of the authenticator. The assurance level may be determined by the methods shown in FIGS. 2 and 3. In some embodiments, the significant level of the ASAL is based on a type and a number of authenticators, wherein the significant level of the PAAL is based on a risk and a role of a user, wherein the significant level of the OPAL is based on location, device, and IP address.

In some embodiments, the first system 102 receives an unknown authenticator and determines an assurance level value of the unknown authenticator by ranking the unknown authenticator in relation to one or more authenticators stored in the first database table lookup. The assurance level may be determined by the methods shown in FIGS. 2 and 3.

Having thus described several aspects and embodiments of the technology of this application, it is to be appreciated that various alterations, modifications, and improvements will readily occur to those of ordinary skill in the art. Such alterations, modifications, and improvements are intended to be within the scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method comprising:
    receiving, by a computer system, a parameter value for each of multiple parameters for an application for an enterprise;
    determining, by the computer system based on a first database table lookup, a recommended authentication vector for the application based on the parameter values, wherein the recommended authentication vector comprises assurance level values for authenticator strength assurance level (ASAL), Post Authentication Assurance Level (PAAL), and Origin Point Assurance Level (OPAL);
    determining, by the computer system based on a second database table lookup, one or more enterprise-certified authentication infrastructures for the application based on the recommended authentication vector; and
    implementing the one or more enterprise-certified authentication infrastructures in the application for a production deployment of the application by the enterprise.

2. The method of claim 1, further comprising:
    determining, by the computer system based on a third database table lookup, a recommended authenticator for a functional tier of the enterprise based on the recommended authentication vector.

3. The method of claim 1, wherein the multiple parameters comprise at least one of a business type, user type, client type, application risk rating, privilege function, access scope, or combinations thereof.

4. The method of claim 1, wherein the assurance level values are based on phishing vulnerabilities, proof of possession strength, replay resistance, difficulty of attribute acquisition, or combinations thereof.

5. The method of claim 1, further comprising:
    storing authenticators in the first database table lookup, wherein the assurance level values comprise a significant level and finer level, wherein the significant level is an integer and the finer level is a floating point number, wherein the assurance level values are a ranking of a strength of the authenticator.

6. The method of claim 5, wherein the significant level of the ASAL is based on a type and a number of authenticators, wherein the significant level of the PAAL is based on a risk and a role of a user, wherein the significant level of the OPAL is based on location, device, and IP address.

7. The method of claim 1, further comprising determining, by the computer system, an assurance level value of a new authenticator for the enterprise by ranking the new authenticator in relation to one or more authenticators stored in the first database table lookup.

8. A system for choosing authenticators, the system comprising:
    a first computer system comprising a first database lookup table to store one or more authenticators and authentication vectors, wherein the authentication vectors comprise assurance level values, wherein the first computer system is further configured to determine a strength of an unknown authenticator based on the one or more authenticators in the first database lookup table;
    a second computer system comprising a second database lookup table for determining a recommended authenticator of the one or more authenticators for a functional tier of an enterprise based on a recommended authentication vector;
    a third computer system comprising a third database lookup table for determining an authentication infrastructure for the recommended authenticator; and
    a fourth computer system for receiving parameter values for multiple parameters for an application for an enterprise, wherein the fourth computer system is configured to implement one or more enterprise-certified authentication infrastructures in the application for a production deployment of the application by the enterprise.

9. The system of claim 8, wherein the parameters are at least one of business type, user type, client type, application risk rating, privilege function, access scope, or combinations thereof.

10. The system of claim 8, wherein the assurance level values are based on phishing vulnerabilities, proof of possession strength, replay resistance, difficulty of attribute acquisition, or combinations thereof.

11. The system of claim 8, wherein the assurance level values comprise a significant level and finer level, wherein the significant level is an integer and the finer level is a floating point number, wherein the assurance level values are a ranking of a strength of an authenticator of the one or more authenticators.

12. The system of claim 11, wherein the authentication vectors comprise a three-dimensional vector comprising assurance level values for authenticator strength assurance level (ASAL), Post Authentication Assurance Level (PAAL), and Origin Point Assurance Level (OPAL).

13. The system of claim 12, wherein the significant level of the ASAL is based on a type and a number of authenticators, wherein the significant level of the PAAL is based on a risk and a role of a user, wherein the significant level of the OPAL is based on location, device, and IP address.

14. The system of claim 8, wherein the first computer system is configured to determine an assurance level value of a new authenticator for the enterprise by ranking the new authenticator in relation to one or more authenticators stored in the first database lookup table.

15. A method of determining an authenticator for an enterprise;
    receiving, from a first computer system, parameter values for multiple parameters for an application for an enterprise;
    determining, by the first computer system, a strength of an unknown authenticator based on one or more authenticators in a first database lookup table;
    determining, by a second computer system, authenticator vector based on the parameter values, wherein the authenticator vector comprises assurance level values;
    determining, by a third computer system, a description of authenticators corresponding to the authenticator vector;
    determining, by a fourth computer system, an infrastructure that supports the assurance level values of the authentication vector; and
    implementing, by the fourth computer system, one or more enterprise-certified authentication infrastructures in the application for a production deployment of the application by the enterprise.

16. The method of claim 15 further comprising determining, by the first computer system, an assurance level value of a new authenticator for the enterprise by ranking the new authenticator in relation to one or more authenticators stored in the first database lookup table.

17. The method of claim 15, wherein the multiple parameters comprise at least one of a business type, user type, client type, application risk rating, privilege function, access scope, or combinations thereof.

18. The method of claim 15, wherein the assurance level values are based on phishing vulnerabilities, proof of possession strength, replay resistance, difficulty of attribute acquisition, or combinations thereof.

19. The method of claim 15, wherein the assurance level values comprise a significant level and finer level, wherein the significant level is an integer and the finer level is a floating point number, wherein the assurance level values are a ranking of a strength of the authenticator.

20. The method of claim 19, wherein the assurance level values comprise authenticator strength assurance level (ASAL), Post Authentication Assurance Level (PAAL), and Origin Point Assurance Level (OPAL), wherein the significant level of the ASAL is based on a type and a number of authenticators, wherein the significant level of the PAAL is based on a risk and a role of a user, and wherein the significant level of the OPAL is based on location, device, and IP address.

\* \* \* \* \*